May 18, 1937.  E. P. DORMAN  2,080,858
LEHR STACKING OR FEEDING MECHANISM
Filed Nov. 13, 1935  2 Sheets-Sheet 2
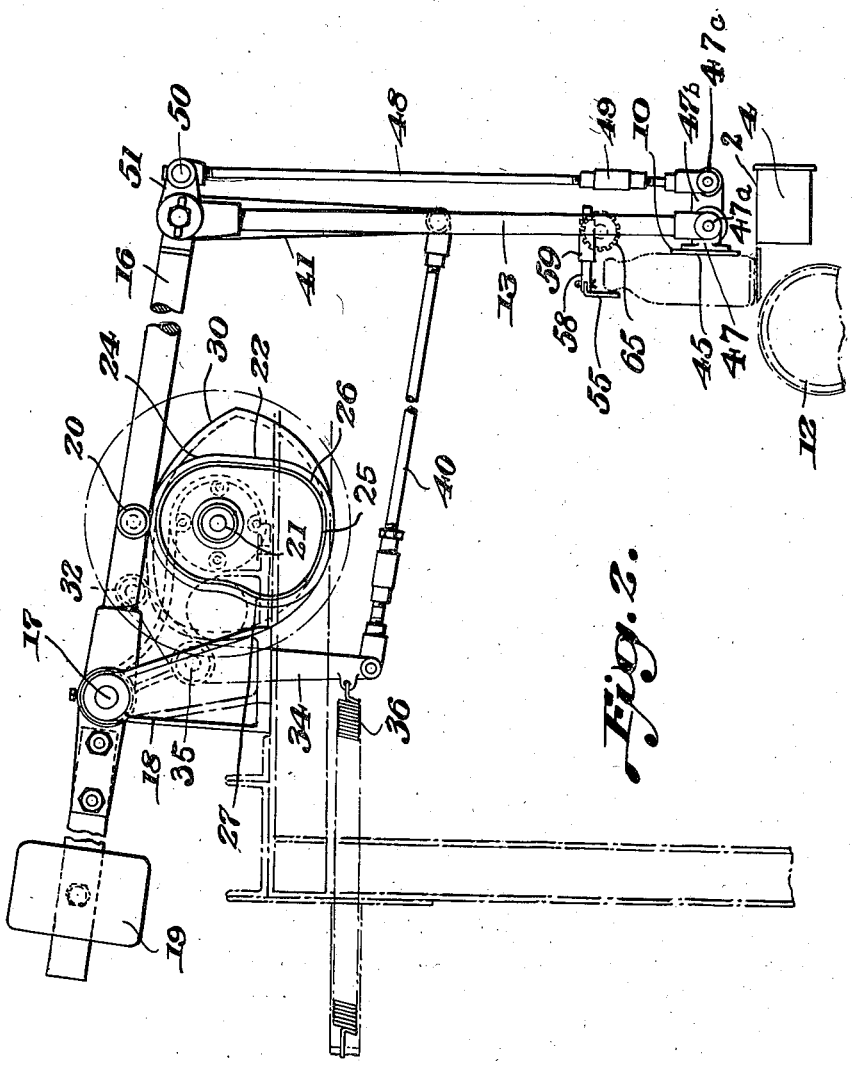
Inventor,
EDGAR PHILIP DORMAN
By Bönnelycke, Young, Emery & Thompson
attys.

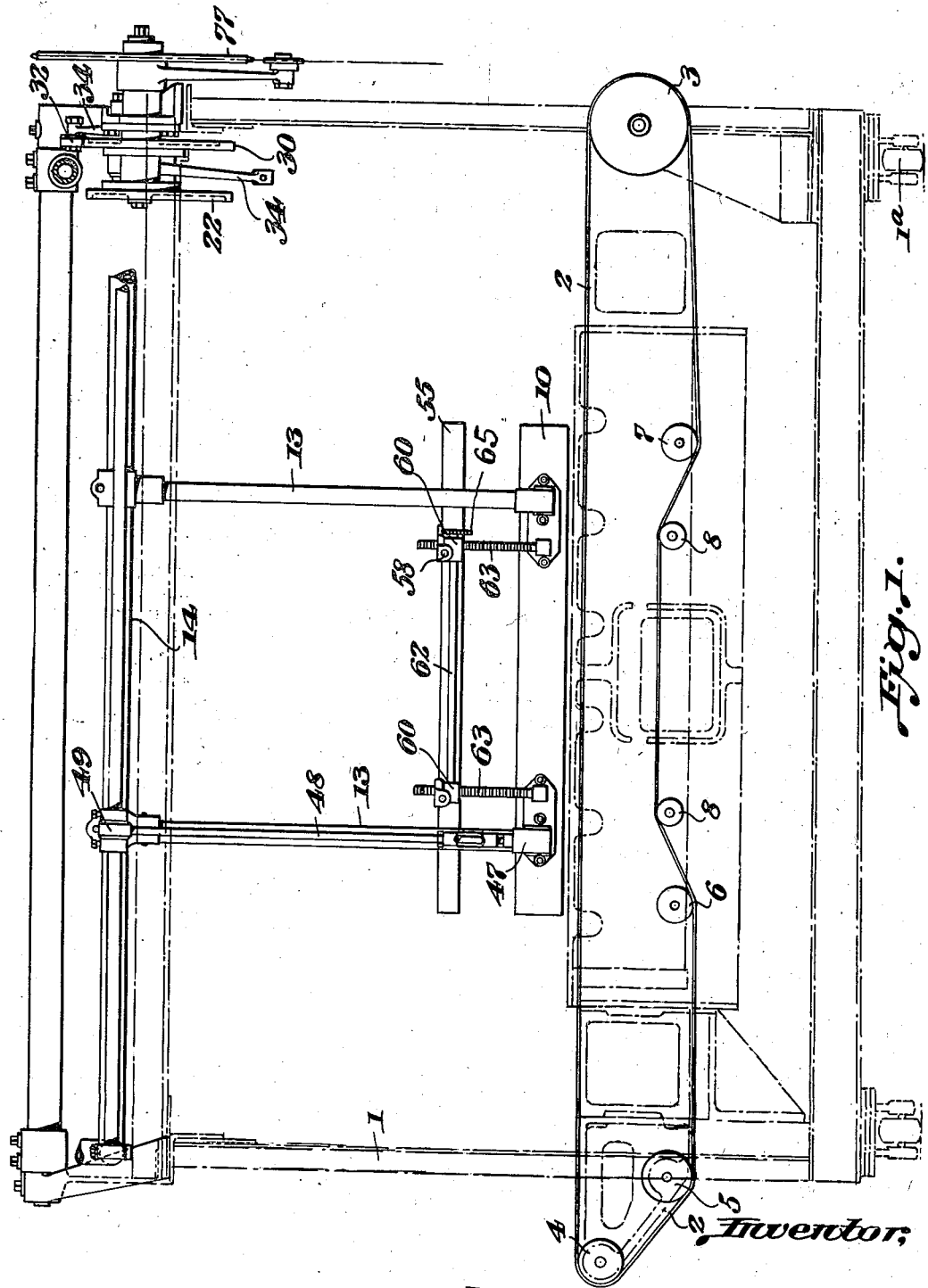

Patented May 18, 1937

2,080,858

UNITED STATES PATENT OFFICE 2,080,858

LEHR STACKING OR FEEDING MECHANISM

Edgar Philip Dorman, London, England, assignor to The United Glass Bottle Manufacturers Limited, London, England, a British company Application November 13, 1935, Serial No. 49,618
In Great Britain June 20, 1934

3 Claims. (Cl. 198—31)

This invention relates to lehr stacking or feeding mechanisms such as are used for introducing glass bottles and other forms of glassware into the entrance of a lehr or annealing chamber and more particularly to lehr feeders of the type in which a stacker or pusher bar is operated automatically and at regular intervals to sweep a row of bottles or the like sideways from a conveyor travelling transversely across the entrance of the lehr. With lehr feeders of the above mentioned type, the ware to be annealed is usually fed to the transfer conveyor by another conveyor hereinafter referred to as "the machine conveyor" and in such a manner that the bottles or the like are carried by the transverse conveyor across the lehr entrance in spaced relationship and in a single file or row, the stacker bar operating mechanism being brought into operation as soon as the foremost bottle of the row approaches the opposite side wall of the lehr tunnel and a complete row of bottles is ready to be transferred into the lehr.

The chief object of the present invention is to provide an improved form of lehr stacking or feeding mechanism of the above mentioned type in which all of the elements can be operated entirely automatically and from a common source of power and which is sufficiently flexible to enable the same to be adjusted quickly and without difficulty according to the nature or dimensions of the ware to be handled.

According to one feature of the invention the improved form of lehr stacking or feeding mechanism comprises a conveyor for carrying the ware transversely across the lehr entrance and means operable at regular intervals to cause a stacker bar to move transversely across the conveyor and to sweep the ware therefrom and into the lehr.

Further features of the invention will be hereinafter described and pointed out.

In order that the said invention may be clearly understood and readily carried into effect, the same will now be more fully described with reference to the accompanying drawings in which:—

Fig. 1 is a view in elevation of the front end of a lehr equipped with a stacker mechanism according to the invention:

Fig. 2 is a side view of the stacker mechanism shown in Fig. 1.

In Fig. 1 of the accompanying drawings, 1 indicates the front end of a lehr which, in the usual manner, is mounted on rollers 1a. The transverse conveyor 2 is arranged transversely across the lehr entrance with its upper run in substantially the same plane as the floor of the lehr tunnel. The conveyor is arranged so that it passes around pulleys 3, 4, 5, 6, and 7 suitably supported by the lehr framework and its lower run may be provided with one or more take-up pulleys 8. The width of the transverse conveyor is preferably slightly more than the maximum diameter of the ware which is preferably fed to the transverse conveyor so that the bottles or the like are caused to travel across the lehr entrance in spaced relationship and in a single file or row.

The means for transferring the ware from the transverse conveyor into the lehr comprise a stacker bar 10 extending almost completely across the full width of the lehr and adapted periodically to be moved transversely across the conveyor so that it is caused to sweep or displace the ware from the transverse conveyor into the lehr proper or into another conveyor which, in the usual manner, extends and moves longitudinally through the lehr tunnel and the rear end of which passes around the drum 12 shown dotted in Fig. 2.

The aforesaid stacker bar is preferably mounted in position upon the lower end of a supporting framework including a pair of parallel depending bars 13 secured at their upper ends to a sleeve 14 displaceable angularly upon a cross bar or shaft 15 arranged above the lehr entrance and carried by a pair of rearwardly extending parallel levers 16 which are secured to the opposite ends of another cross shaft 17 journalled in a pair of brackets 18 arranged one at each side of the upper portion of the lehr tunnel framework. The supporting framework thus formed is suitably counterweighted as, for example, by one or more counterweights 19 on the free end or ends of the levers 16 and, at a point between its pivotal mounting and the depending bar 13, one of the levers 16 is provided with a cam roller 20 bearing against a cam 22 secured to a horizontally disposed shaft 21 also suitably journalled in brackets mounted in position at one side of the upper part of the lehr tunnel structure. The cam 22 is shaped so that it includes a part 24 concentric with its axis of rotation, another part 25 also concentric with such axis of rotation but having a greater radius and the two interconnecting surfaces 26 and 27, the arrangement being such that the levers 16 and the stacker bar 10 depending therefrom are raised and lowered once during each revolution of the cam and are permitted to remain in each position for a predetermined period.

The stacker bar framework is also provided with means for imparting another movement thereto, to wit, a pivotal movement about the axis of the cross bar or shaft 15, the two movements being timed and combined so that the stacker bar 10, after descending into a position behind a newly formed row of bottles or the like on the transverse conveyor, is caused to move in a substantially horizontal direction across the conveyor and then to ascend clear of the displaced row and the succeeding row being formed on the transverse conveyor and finally to move backward over the top of and into a position behind the said succeeding row ready to displace or sweep the same into the lehr immediately the row is completed. For this purpose, a second cam 30 is provided disposed coaxially and rotating with the cam 22. The cam 30 is engaged by a cam roller 32 provided at one end of a bell-crank lever 34 which is pivotally mounted at 35 in a bearing provided for the purpose in the bracket 18. To the other end of the said bell-crank lever is secured both a tension spring 36 serving to hold the cam roller 32 in contact with the cam 30 and an adjustable link 40, the opposite end of the latter being connected to the lower end of a depending arm 41 having its upper end connected to the angularly displaceable sleeve 14. Thus the spring 36 also serves to urge the stacker bar into a forward position and, by the cooperation of the cams 22 and 30, and their associated levers, the stacker bar is periodically raised, moved rearwardly and then lowered whereupon, owing to the shaping of the cam 30, the spring 36 is then permitted to come into action to return the stacker bar to its former forward position.

Means are also preferably provided for ensuring that the front or ware displacing face 45 of the stacker bar shall be maintained substantially vertical throughout the various movements of the stacker bar, thus avoiding any tendency which there might otherwise be to cause the bottles or the like to be knocked or pushed over. For this purpose, the stacker bar, instead of being rigidly secured to the lower ends of the depending bars 13, is carried by a pair of rearwardly extending brackets or rods 47 pivotally connected at 47a to the lower ends of the bars 13 and one of the said brackets or rods is formed with an extension 47b having its rear end pivotally connected at 47c to the lower end of a vertically disposed link 48 provided with a turnbuckle 49 for adjusting its length, the upper end of the link 48 being pivotally mounted upon a transverse rod 50 disposed parallel with and a short distance from the angularly movable sleeve 14. The ends of the rod 50 are secured in extensions 51 of the levers 16 so that the whole forms a parallel motion linkwork for the stacker bar. If desired, the length of the link 48 may be adjusted so as to maintain the front face of the stacker bar in an inclined instead of a vertical position, this being particularly useful when annealing ware formed with inclined outer walls. Also, in some instances, there may be arranged above the stacker bar so as to be parallel therewith a neck guard 55, the arrangement being such that the neck guard is disposed forwardly of the front face of the stacker bar and is adapted to be brought into position behind the upper ends or the necks of the ware or bottles, as indicated in Fig. 2, and thus ensure that the ware is held in an upright position during displacement from the transverse conveyor and into the lehr.

Means are also preferably provided for enabling the position of the neck guard to be adjusted relatively to the stacker bar to suit different sizes or types of ware. For this purpose, the neck guard is preferably carried by a pair of spaced and horizontally or forwardly extending rods 58 screw threaded into a pair of nuts or internally threaded bushes 59 which are, in turn, adjustably supported in position upon a pair of carriers 60 adapted to be displaced vertically as, for example, by a rack or pinion arrangement. For instance, each carrier may be formed with vertical and horizontal openings, the horizontal openings being formed and arranged to enable a spindle 62 to be passed therethrough and the vertical openings being formed to accommodate a pair of vertically disposed spindles 63 the lower ends of which are suitably secured to the stacker bar and the circumferential surfaces of which are formed with a series of grooves to form racks. Engaging with the racks are a pair of gear wheels carried by the horizontal spindle 62 which is preferably provided at one end with a handwheel 65 capable of being locked in any of its adjusted positions. Thus, by the rotation of the handwheel 65, the two carriers 60 and the neck guard 55 carried thereby can be raised or lowered relatively to the stacker bar to suit the height of the ware being fed to the lehr and, by the adjustment of the nuts or bushes 58, the neck guard can be displaced rearwardly or forwardly to suit the diameter of the neck or upper part of the ware.

The aforesaid transverse conveyor 2 and the stacker bar operating cams 22 and 30 are preferably driven at predetermined and related speeds from a common source of power so that the frequency of operation of the stacker bar is dependent upon the time taken to form a complete row of bottles on the transverse conveyor. Thus, for example, in the arrangement illustrated, the transverse conveyor and the cams 22 and 30 are all driven from a driving shaft connected by a chain drive with a sprocket 77 on the shaft 21 carrying the cams 22 and 30.

I claim:

1. A lehr stacking mechanism for sweeping ware from a conveyor carrying ware transversely across a lehr entrance into a lehr, comprising a pair of downwardly depending bars, means for mounting the upper ends of said bars for swinging movement about a substantially horizontal axis positioned above and extending across the lehr entrance, a stacker bar extending transversely across the lehr entrance and having a surface for engaging the ware to be stacked, means for pivotally mounting said stacker bar on the lower ends of said depending bars, a third downwardly depending bar, means supporting the upper end of said third bar for pivotal movement about a spaced substantially horizontal axis parallel to and lying in substantially the same horizontal plane as the axis about which the upper ends of said pair of bars swing, a lever extending rearwardly from said stacker bar, means for pivotally connecting the lower end of said third bar to the free end of said lever to provide a four-bar linkage to maintain a constant position of said stacker bar relative to the vertical, means for adjusting the effective length of said third bar to vary the position of said stacker bar, and means for swinging said depending bars about their supporting axes.

2. A lehr stacking mechanism for sweeping ware from a conveyor carrying ware transversely across a lehr entrance into the lehr, comprising a pair of levers, means for mounting said levers for rocking movement about a horizontal axis above and extending transversely across the lehr, one end of each lever extending to a point above the lehr entrance, said ends of the levers being in horizontal alignment, a pair of downwardly depending bars, means for mounting the upper ends of said bars on the said ends of the levers for swinging movement about a substantially horizontal axis positioned above and extending across the lehr entrance, a stacker bar extending transversely across the lehr entrance and having a surface for engaging the ware to be stacked, means for pivotally mounting said stacker bar on the lower ends of said depending bars, a third downwardly depending bar, means carried by said ends of the levers for supporting the upper end of said third bar for pivotal movement about a spaced substantially horizontal axis parallel to and lying in substantially the same horizontal plane as the axis about which the upper ends of said pair of bars swing, a lever extending rearwardly from said stacker bar, means for pivotally connecting the lower end of said third bar to the free end of said lever to provide a four-bar linkage to maintain the position of said stacker bar relative to the vertical, means for adjusting the effective length of said third bar to vary the position of said stacker bar, and means for swinging said depending bars about their supporting axes.

3. A lehr stacking mechanism for sweeping ware from a conveyor carrying ware transversely across a lehr entrance into the lehr, comprising a pair of levers, means for mounting said levers for rocking movement about a horizontal axis above and extending transversely across the lehr, one end of each lever extending to a point above the lehr entrance, said ends of the levers being in horizontal alignment, a pair of downwardly depending bars, means for mounting the upper ends of said bars on the said ends of the levers for swinging movement about a substantially horizontal axis positioned above and extending across the lehr entrance, a stacker bar extending transversely across the lehr entrance and having a surface for engaging the ware to be stacked, means for pivotally mounting said stacker bar on the lower ends of said depending bars, a third downwardly depending bar, means carried by said ends of the levers for supporting the upper end of said third bar for pivotal movement about a spaced substantially horizontal axis parallel to and lying in substantially the same horizontal plane as the axis about which the upper ends of said pair of bars swing, a lever extending rearwardly from said stacker bar, means for pivotally connecting the lower end of said third bar to the free end of said lever to provide a four-bar linkage to maintain the position of said stacker bar relative to the vertical, means for adjusting the effective length of said third bar to vary the position of said stacker bar, means for swinging said depending bars about their supporting axes, and means for rocking said pair of levers to raise and lower said stacker bar.

EDGAR PHILIP DORMAN.